Patented Sept. 6, 1932

1,875,602

UNITED STATES PATENT OFFICE

RICHARD HERZ AND NORBERT STEIGER, OF FRANKFORT-ON-THE-MAIN, AND WILHELM HECHTENBERG, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PRODUCTION OF FAST PRINTINGS ON THE VEGETABLE FIBER

No Drawing. Application filed June 10, 1930, Serial No. 460,286, and in Germany July 10, 1929.

In U. S. Patent No. 1,588,384 a manufacture of quinone vat dyestuffs is described which dyestuffs correspond probably to the general formula:

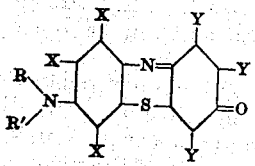

(wherein R' means an aryl group, which may or may not otherwise contain substituents, R indicates hydrogen which may be substituted by alkyl or aralkyl, X hydrogen or a monovalent substituent and Y hydrogen or halogen).

According to the statements of that specification these dyestuffs are soluble in an alkaline hydrosulfite solution and dye especially animal fibers various shades.

The present invention is based on the surprising observation that the above mentioned dyestuffs possess such an affinity, even to the vegetable fiber, that they can be fixed on the vegetable fiber, especially on cotton, according to the methods of printing usual for vat dyestuffs, with the production of full and entirely fast printings.

This fact is as more surprising as the dyestuffs, as shown by the above formula, are analoga of the known dimethyl-thionoline described by Bernthsen (Annalen, vol. 230, page 201). This dimethyl-thionoline does not exhibit any direct affinity to the vegetable fiber. It can be reduced by means of hydrosulfite, yields however when printed on cotton in the manner usual for printing with vat dyestuffs, bluish gray printings which are removed from the fiber by washing.

In contradistinction thereto the dyestuffs used by the present process show an excellent affinity to the vegetable fiber, though they contain a single carbonylic group capable of being enolized and their molecule is increased by the aryl radical present (R' in the above formula).

In the printing process, especially in printing with not previously reduced dyestuffs (the so-called rongalite-potash process), the reducing agent (formaldehyde-sulfoxylate+ potash) is operative only during a few minutes' steaming in the Mather-Platt. During this operation the reduction of the dyestuff to the leuco compound as well as its fixation on the fiber is to be effected.

The above mentioned dyestuffs are so easy to be reduced and show so great an affinity to the vegetable fiber that they are fixed on the fiber during the short steaming operation with a full yield and a good fastness to washing. As to these properties they surpass the known dyestuffs of the indigo and thioindigo series usual for printing cotton.

The dyestuffs yield when printed on the vegetable fiber especially on cotton according to the usual methods, navy blue to greenish blue printings distinguished by beautiful shades and a good fastness to washing and light. Some of these dyestuffs exhibit furthermore a fastness to chlorine satisfying the requirements of the practice.

On account of their strong tinctorial intensity they allow economical use and they comply therefor with an old demand of textile industry as to fast blue, particularly navy blue printing colours which are cheaper than the blue anthraquinone and indigoid vat dyestuffs hitherto used. Of a special value are those of these dyestuffs which correspond to the general formula:

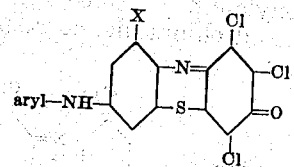

(wherein X means methyl or methoxy).

In order to further illustrate our invention the following examples are given, the parts being by weight and all temperatures in centigrade degrees, but it is however to be understood, that our invention is not limited to the particular products nor reacting conditions mentioned therein.

*Example*

100 grs. of a paste or 15 grs. powder of the vat dyestuff obtained by condensing 5(-3' chlorophenylamino)-3-methyl-2-aminothiophenol with chloranil are mixed with
110 grs. or 195 grs. respectively of water and
50 grs. of glycerine,
450 grs. of a neutral starch-traganth-thickening are added, and
120 grs. of potassium carbonate,
20 grs. of the sodium salt of benzylsulphanilic acid, and
150 grs. of a solution (1:1) of formaldehyde-sulfoxylate.

1000 grs.

After having been printed and dried the cotton material is steamed for about 2-6 minutes in the Mather-Platt apparatus, well washed and after chromed in a weakly acid bath in order to accelerate the oxidation. Then it is rinsed and soaped while boiling hot. In this manner a beautiful reddish blue printing is obtained.

The dyestuff thus fixed on the fiber corresponds to the formula:

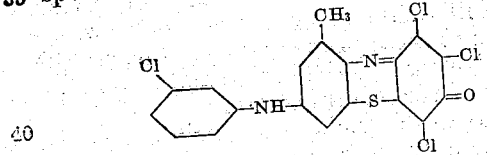

More bluish dark shades are obtained by using in the above example the dyestuff obtainable by condensing chloranile with 5-(3' chloro-phenylamino)-3-methoxy-2-amino-1-thiophenol and corresponding to the formula:

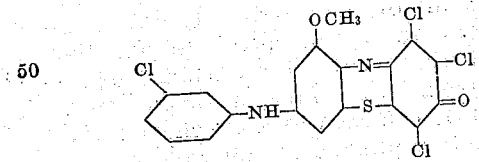

Still less reddish shades are obtained by means of the dyestuff obtainable from 5-(4'-methyl-phenylamino) 3-methyl-2-amino-1-thiophenol and chloranile, corresponding to the formula:

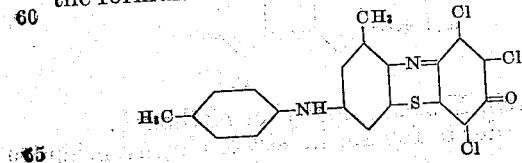

Clear greenish blue shades are produced by the dyestuff of the formula:

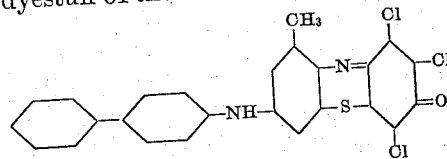

We claim:

1. Process which comprises printing vegetable fibers according to the direct printing methods usual for vat dyestuffs, with the quinone vat dyestuffs of the probable general formula:

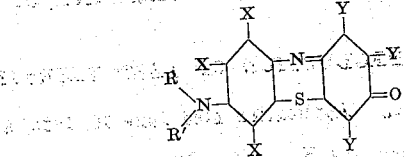

(wherein R' means an aryl group which may or may not otherwise contain substituents, R indicates hydrogen which may be substituted by alkyl or aralkyl, X hydrogen or a monovalent substituent and Y hydrogen or halogen).

2. Process which comprises printing vegetable fibers according to the direct printing methods usual for vat dyestuffs, with the quinone vat dyestuffs of the probable formula:

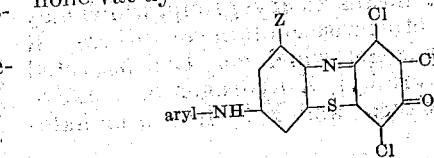

(wherein Z means methyl or methoxy).

In testimony whereof, we affix our signatures.

RICHARD HERZ.
NORBERT STEIGER.
WILHELM HECHTENBERG.